US005129413A

United States Patent [19]

Puder et al.

[11] Patent Number: 5,129,413

[45] Date of Patent: Jul. 14, 1992

[54] SELF WASHING STORAGE TANK

[75] Inventors: Hugh E. Puder; Charles S. Hanskat, both of Gainesville, Fla.

[73] Assignee: The Crom Corporation, Gainesville, Fla.

[21] Appl. No.: 618,249

[22] Filed: Nov. 28, 1990

[51] Int. Cl.$^5$ .......................... B08B 3/04; B08B 9/08; F16K 21/18

[52] U.S. Cl. .......................................... 137/2; 137/238; 137/386; 137/392; 137/576; 137/592; 210/150; 210/255; 52/224; 52/744

[58] Field of Search .................... 134/169 R; 137/386, 137/392, 571, 574, 576, 592, 1, 2, 238, 240, 391; 210/150, 255; 220/565; 52/224, 744

[56] References Cited

U.S. PATENT DOCUMENTS

| | | | |
|---|---|---|---|
| 2,128,617 | 8/1938 | Lawlor | 137/592 |
| 2,237,882 | 4/1941 | Lawlor et al. | 210/150 |
| 2,531,742 | 11/1950 | Pomykala | 220/565 |
| 2,585,440 | 2/1952 | Collins | 210/150 |
| 2,597,084 | 5/1952 | Huddleston | 220/565 |
| 3,193,099 | 7/1965 | Soriente et al. | 137/592 |
| 3,671,142 | 6/1972 | Calabrese | 137/392 |
| 3,747,381 | 7/1973 | Ulm et al. | 220/565 |
| 3,822,520 | 7/1974 | Crom, Jr. | 52/224 |
| 3,825,119 | 7/1974 | Rost | 210/150 |
| 4,421,534 | 12/1983 | Walker | 210/150 |

FOREIGN PATENT DOCUMENTS

| | | | |
|---|---|---|---|
| 2308166 | 8/1974 | Fed. Rep. of Germany | 210/255 |
| 2447338 | 4/1976 | Fed. Rep. of Germany | 210/255 |

*Primary Examiner*—George L. Walton
*Attorney, Agent, or Firm*—Staas & Halsey

[57] ABSTRACT

A self washing water storage tank has a floor, a cylindrical, generally upright, peripheral concrete wall which sits on the floor and extends around and defines a water storage chamber, and a concrete roof that is mounted atop the wall in substantial covering relationship to the chamber. The roof is essentially flat and has an internal surface which faces the chamber. The tank is arranged such that during the fill cycle the water level rises to a high water level which is above the interior surface of the roof so that such surface is washed during each fill cycle to prevent damage from corrosive gases which may escape from the water and accumulate on the interior surfaces of the tank above the water level.

23 Claims, 5 Drawing Sheets

SELF WASHING STORAGE TANK

BACKGROUND OF THE INVENTION

1. Field of the Invention

This invention relates to concrete storage tanks and in particular to concrete tanks for storing potable well water and which are susceptible to damage from accumulated sulfuric acid or residue produced when $H_2S$ released as a gas from well water accumulates on the tank walls and inner surfaces of the roof in the area above the high water level (commonly known as the free board area) during storage.

2. The Prior Art Environment

Water drawn from wells for human consumption often contains hydrogen sulfide ($H_2S$) gas. Such water is known as sulfur water and it smells bad. To make the water palatable it is traditional to equip storage tanks with an aerator. The aerator is generally mounted on top of the tank and the water to be stored is pumped from the well and into the aerator where it flows by gravity into the tank itself.

The aerators used for such purposes include a series of trays and as the water flows over the trays it particulates and releases the $H_2S$ gas. Enough $H_2S$ remains in the water, however, so that the water in the tank continues to release $H_2S$ into the freeboard area above the water level. When the $H_2S$ gas contacts walls in the free board area including the underside of the concrete roof, it is converted into sulfuric acid which accumulates and attacks the concrete.

Traditionally epoxy coatings have been used to protect the concrete, and this works well as long as the coatings are in good condition. If the coatings break down or the concrete is otherwise exposed to the sulfuric acid attack, it can and does deteriorate. Moreover, for structural economy and efficiency, many prior art concrete tanks have been provided with domed roofs which are not suitable for being filled underneath with water because the water head from the highest point under the roof to the lowest point at the periphery of the roof generally is sufficient to cause the roof to lift or collapse in the absence of extremely expensive and impractical strengthening of the structure of the roof.

SUMMARY OF THE INVENTION

Historically it has been noted that only those concrete surfaces above the high water line, including the interior surfaces of the roof, are damaged by the sulfuric acid created by the presence of $H_2S$ in the water. That is to say, the concrete surfaces below the high water line do not suffer even when they are not coated. Thus, in accordance with the present invention, it has been concluded that there is a washing action from the water contents of the tank so that as pumps are turned on and off the level of water in the tank fluctuates, and the concrete walls are washed and are therefore protected from damage.

The present invention therefore provides for the setting of the high water level in the tank so that the roof is washed just like the walls are washed. Typically, level control floats or switches are installed on these tanks so that when the water level reaches a certain minimum elevation, the pumps are turned on automatically. The tank is then filled with water, and when the high water level is reached, the controls shut off the pumps automatically. So, in accordance with the invention, the high water level is set a few inches above the underside of the tank roof, thus making sure that as the water fluctuates, the underside of the roof is washed.

As discussed above, the domed roofs traditionally used in the concrete storage tank field are not suitable for such an operation because they are not heavy enough and/or strong enough to resist lifting and/or collapse when filled from underneath with water. Accordingly, and pursuant to one preferred embodiment of the invention, the water storage tank is provided with a roof which is essentially flat so as to avoid the problems inherent in the prior art domed roofs.

Thus, the invention provides a self washing storage tank comprising a generally upright, peripheral concrete wall extending around and defining a water storage chamber. The tank includes a concrete roof mounted atop the wall in substantial covering relationship to the chamber. The roof has an internal surface that faces the chamber and which has an opening therein defining a confined space. The space is in fluid communication with the chamber and is disposed at an elevation that is higher than the internal surface of the roof. The tank also includes conduit means for introducing water to be stored into the chamber and a water level controller device that is arranged to permit the flow of water into the chamber through the conduit means until water in the chamber rises to contact and wash the internal surfaces of the roof and to move into the space. In accordance with the invention the roof is configured and structured so as to resist the buoyancy of water filling the area beneath the roof and thus prevent lifting or collapse of the roof when the water in the chamber is in contact with the entire extent of the interior surface of the roof.

In a preferred form of the invention the roof may be essentially flat and the peripheral concrete wall may be cylindrical. Ideally the wall may consist of a prestressed composite wall.

The tank may include an interior baffle wall which divides the chamber into two or more chamber portions. Preferably the baffle wall provides vertical support for the flat roof. In a particularly preferred form of the invention, the baffle wall which supports the roof may be cylindrical and concentrically arranged relative to a cylindrical peripheral wall.

Preferably the tank may include a sensor disposed at a predetermined level in the space presented by the opening in the roof for generating a signal when water rises into the space and comes into contact with the sensor. Ideally, the tank may include a control valve in the conduit means which is operable to close the conduit means in response to the generation of a signal by the sensor.

In accordance with another aspect of the invention, a method is provided for washing the interior surfaces of the concrete water storage tank having a generally upright, peripheral wall extending around and defining a water storage chamber and a concrete roof mounted atop the wall in substantial covering relationship to the chamber. In accordance with this aspect of the invention the roof has an internal surface facing the chamber and an opening therein defining a confined space which is in fluid communication with the chamber and which is disposed at an elevation that is higher than the internal surface of the roof. The method comprises the steps of storing water in the chamber under the conditions such that water is periodically withdrawn therefrom for use; periodically introducing water to be stored into said chamber; and controlling the introduction of water into the tank in such a manner that the introduction continues until water in the chamber rises to contact and wash the internal surface of the roof and move into the space.

DETAILED DESCRIPTION OF THE PREFERRED EMBODIMENTS OF THE INVENTION

Figure 1:
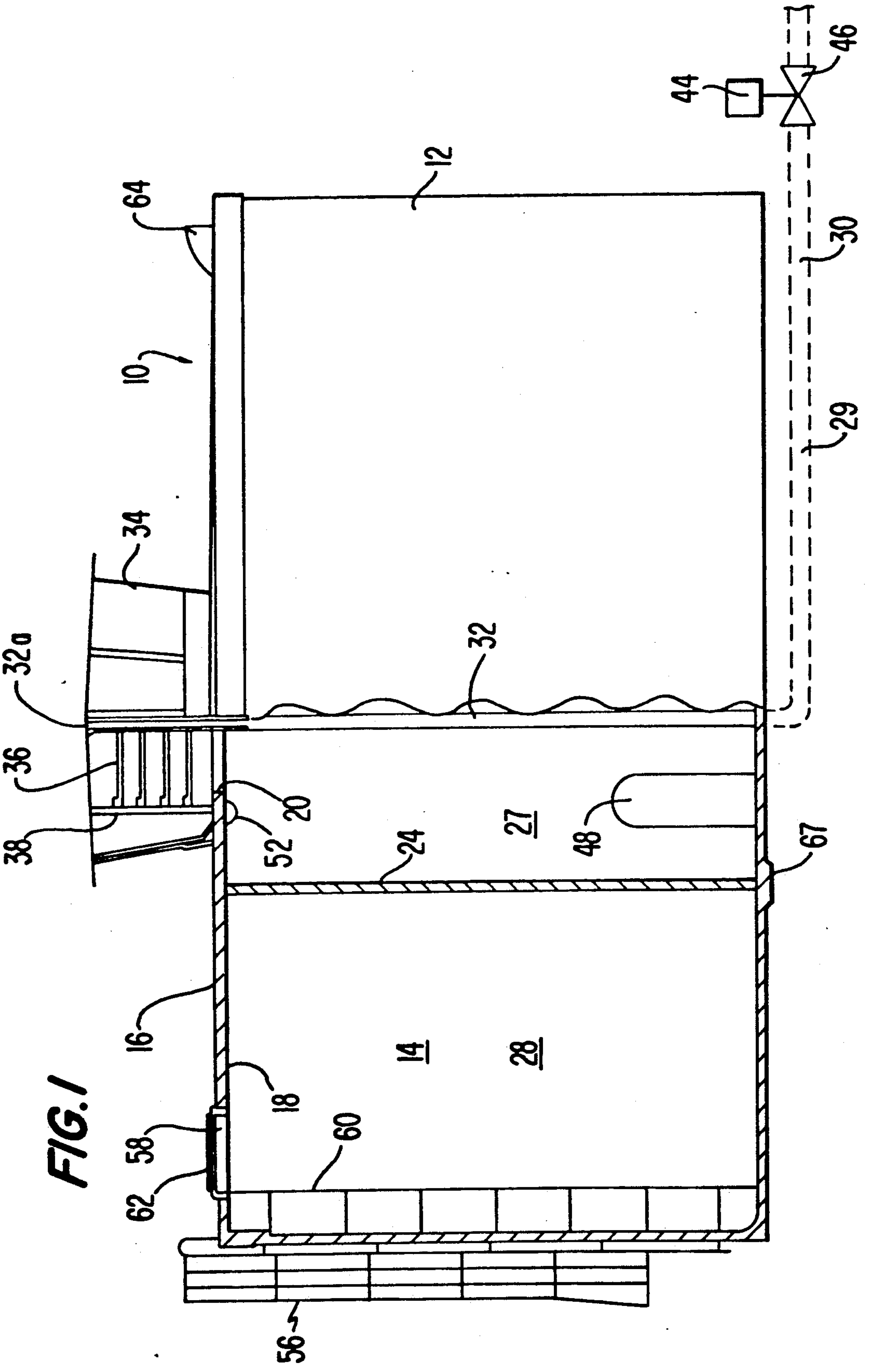
FIG. 1 is an elevational view of a water storage tank which embodies the concepts and principles of the invention, and wherein a portion of the peripheral wall has been broken away to illustrate internal details of the tank.
Figure 2:
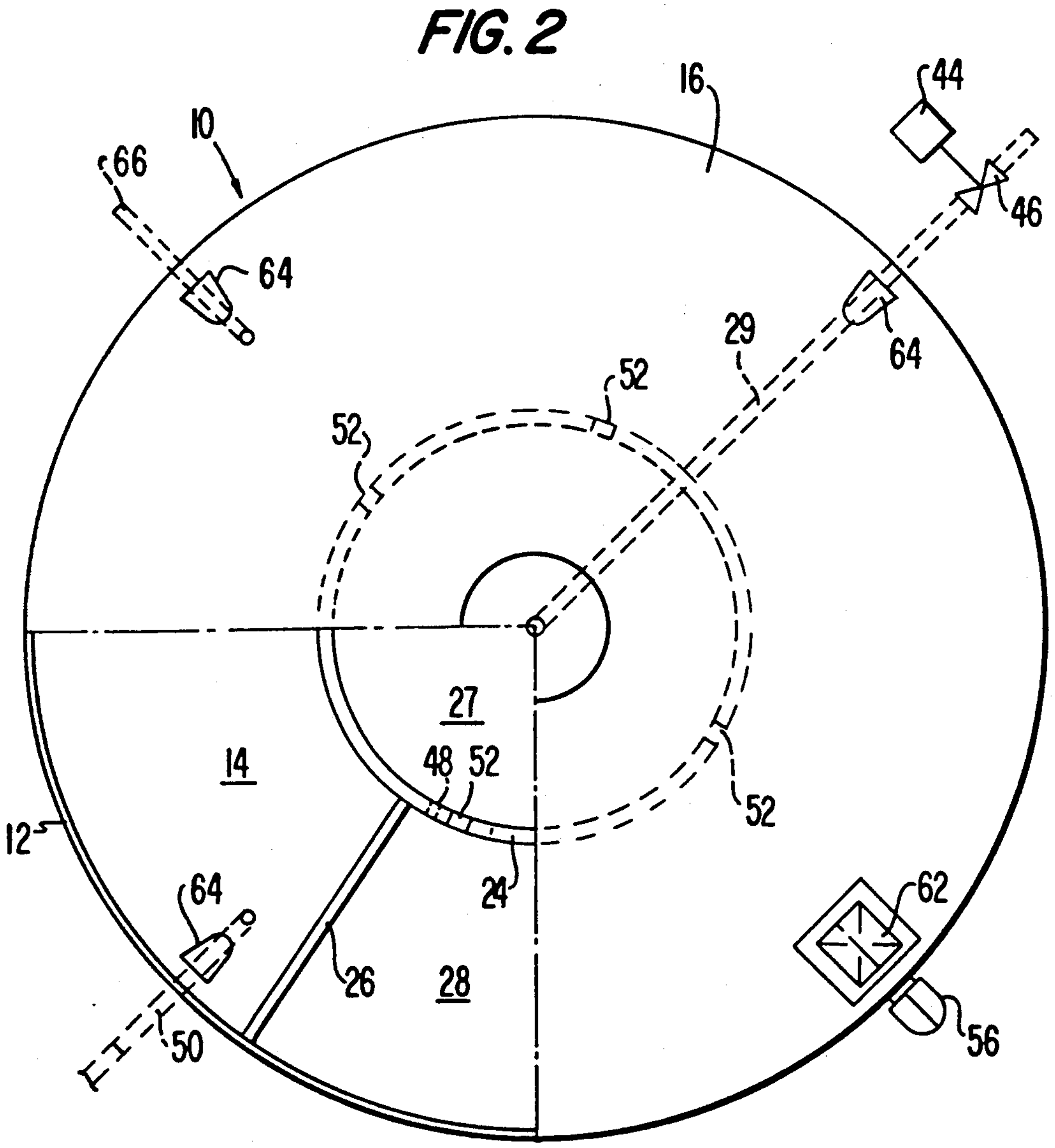
FIG. 2 is a top plan view of the tank of FIG. 1 wherein the aerator has been removed and wherein a portion of the roof has been broken away to illustrate internal details of the tank.

A self washing storage tank 10 which embodies the principles and concepts of the present invention is illustrated particularly in FIGS. 1 and 2 of the drawings. Tank 10 includes a floor 68 and a generally upright, cylindrical, peripheral concrete wall 12 which extends upwardly from floor 68 and which also extends around and defines a water storage chamber 14.

Figure 6:
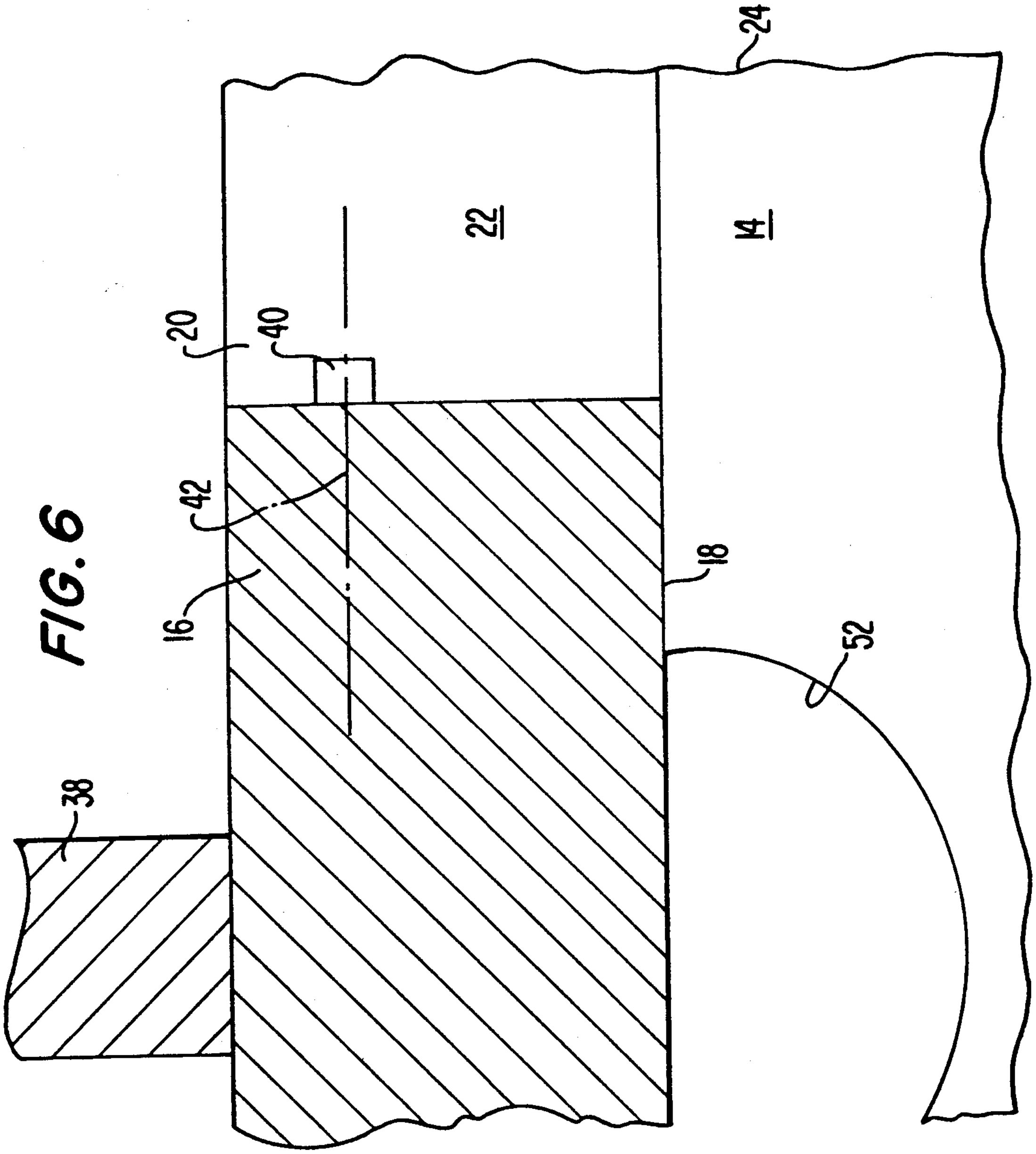
FIG. 6 is an enlarged, fragmentary, cross-sectional view illustrating the details of the tank at the center of the roof under the aerator.

Tank 10 also includes a concrete roof 16 which is mounted atop wall 12 in substantial covering relationship to chamber 14. Roof 16 has an internal surface 18 which faces chamber 14. Roof 16 also has an opening 20 therein which defines a confined space 22 which may be best seen with reference to FIG. 6. Space 22 is in fluid communication with chamber 14, and as can be seen in FIGS. 1 and 6, spaoe 22 is disposed at an elevation which is higher than interior surface 18 of roof 16. In this regard, roof 16 may preferably be essentially and sufficiently flat and heavy so as to resist the buoyancy of water filling the area beneath roof 16 and thus prevent lifting and/or collapse of roof 16 when water in chamber 14 is in contact with the entire extent of the interior surface 18 of roof 16.

Figure 4:
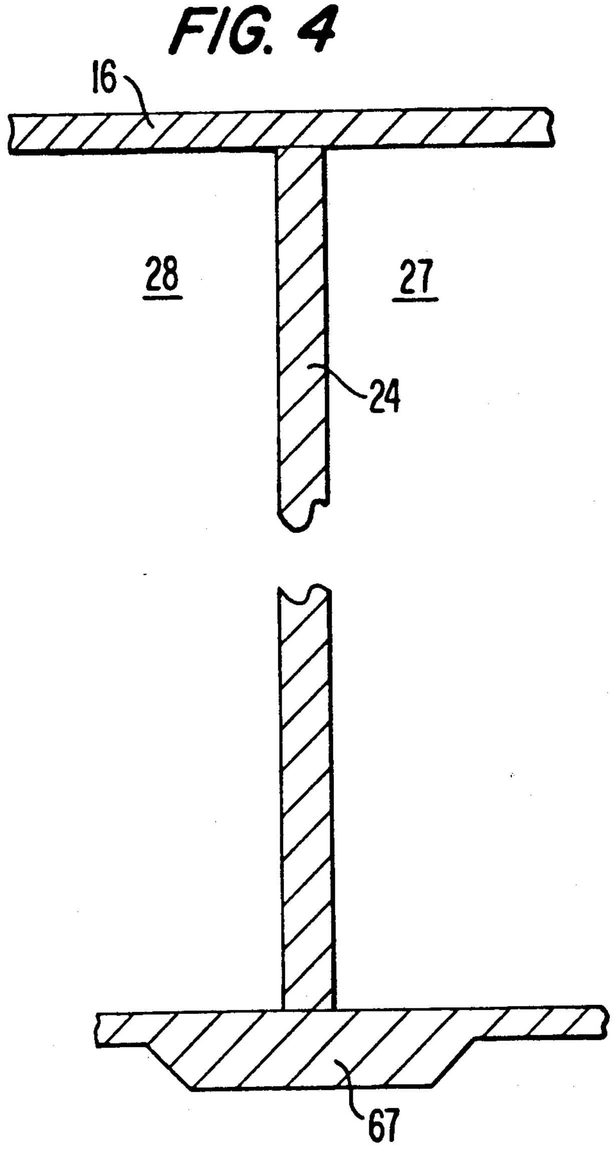
FIG. 4 is an enlarged, fragmentary, cross-sectional view illustrating a typical construction for the internal baffle walls.

Tank 10 also includes a generally cylindrical baffle wall 24, which, as can be seen in FIG. 4, provides support for roof 16. Tank 10 also includes a radially extending baffle wall 26. Cylindrical baffle wall 24 and radially extending baffle wall 26 provide internal baffle wall means dividing chamber 14 into chamber portions 27 and 28.

The tank 10 includes conduit means in the form of a pipe 29 by way of which water is introduced into chamber 14 for storage. Pipe 29 includes a generally horizontal portion 30 and a generally vertical portion 32, as can best be seen in FIG. 1. Portion 32 of pipe 29 rises to the top of an aerator 34 which is mounted on top of roof 16. Aerator 34 is a conventional apparatus which preferably may have a capacity of about 1300 GPM and which includes a series of trays 36 that are supported by a conventional tray support structure 38. Thus, water delivered to the top 32*a* of pipe portion 32 cascades down over trays 36 where the water is particulated so as to release $H_2S$ contained therein. After leaving aerator 34, the water, which is at least partially freed of $H_2S$, falls by gravity through opening 20 and into inner chamber portion 27 within cylindrical baffle wall 24.

Tank 10 further includes a water level controller device which is arranged so as to permit flow of water into chamber 14 through pipe 29 until the water level in chamber 14 rises to contact and wash surface 18 and move into space 22 in opening 20 of roof 16. The water level controller device includes a sensor 40 which is disposed at a predetermined high water level 42 in space 22. Sensor 40 may be a conventional instrument which simply is capable of generating an electrical or pneumatic signal when the same is contacted by water. The signal generated by sensor 40 may then be transmitted to the controller 44 of a control valve 46 whereby valve 46 is operated to close pipe 29 when controller 44 receives the signal generated by sensor 40. At this time the water level has reached the high water level 42 in space 22 and the water thus completely fills chamber 14 and is therefore in washing contact with all internal surfaces of the tank including internal surface 18 of roof 16.

Figure 5:
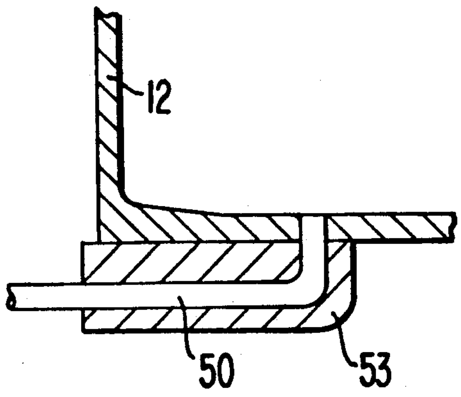
FIG. 5 is an enlarged, fragmentary, cross-sectional view illustrating the details of a typical pipe installation.

With reference to FIG. 2 it can be seen that the external peripheral wall 12 of tank 10 and the internal baffle wall 24 are each cylindrical and the same are concentrically arranged so as to divide chamber 14 into an internal chamber portion 27 and an external chamber portion 28. An opening 48 is provided at the lower portion of baffle wall 24 to facilitate flow of water through chamber 14. Thus, water in tank 10 moves from chamber portion 27 through opening 48 and into chamber portion 28. After entering chamber portion 28 the water flows around the baffle wall 24 until it reaches outlet 50 where it is delivered to satisfy a demand in a usual and conventional manner. The general construction of outlet pipe 50 is illustrated in FIG. 5 where it can be seen that an encasement block 53 of concrete supports pipe 50 in a generally conventional manner. Pipe 29 may of course be supported in a similar manner with a concrete encasement block similar to the block 53 but which extends from the central portions of tank 10 to the outer periphery thereof.

Roof 16 must be configured and structured so as to resist the buoyancy of water filling the area beneath roof 16 to thus prevent lifting or collapse of the roof 16 when the water in the tank is in contact with the entire extent of the interior surface of the roof. In a practical sense roof 16 may be essentially flat. However, the roof 16 may preferably be conically shaped such that it has a slight slope from the periphery of the tank 10 to the central opening 2 thereof to prevent pockets of air from being caught underneath the roof 16 as the water rises inside the tank to wash surface 18. In a very practical sense, a slope of 1 inch for each 7 feet of radius should suffice. Also, the tank should preferably be provided with a series of vent holes 52 at the top of baffle wall 24 to permit air pockets to move past wall 24 and toward opening 20 in roof 16 as chamber 14 fills. The vent holes 52 will assure a thorough cleansing of all of the internal surfaces 18 of roof 16.

The invention is applicable to concrete tanks generally wherever a concrete tank is called upon to store water which contains a dissolved, potentially corrosive or chemically reactive gas. The tanks may be of any shape and the roofs thereof may be flat, conical or domed, the main criteria being that if the center of the roof is higher than the peripheral edges thereof, the roof must be heavy enough to resist the buoyancy of the water which fills the area beneath the roof. The invention also has merit in connection with either prestressed or conventional reinforced concrete tanks.

In a particularly useful application the invention has great utility in connection with prestressed composite tanks of the sort which are described fully in U.S. Pat. No. 3,822,520. The walls of such tanks have a continuous steel diaphragm therein Which extends all of the way around the tank. Shotcrete is applied on both sides of the continuous diaphragm and strands of prestressing wire are wrapped around the periphery of the tank so that the entire composite wall is put into compression.

Figure 3:
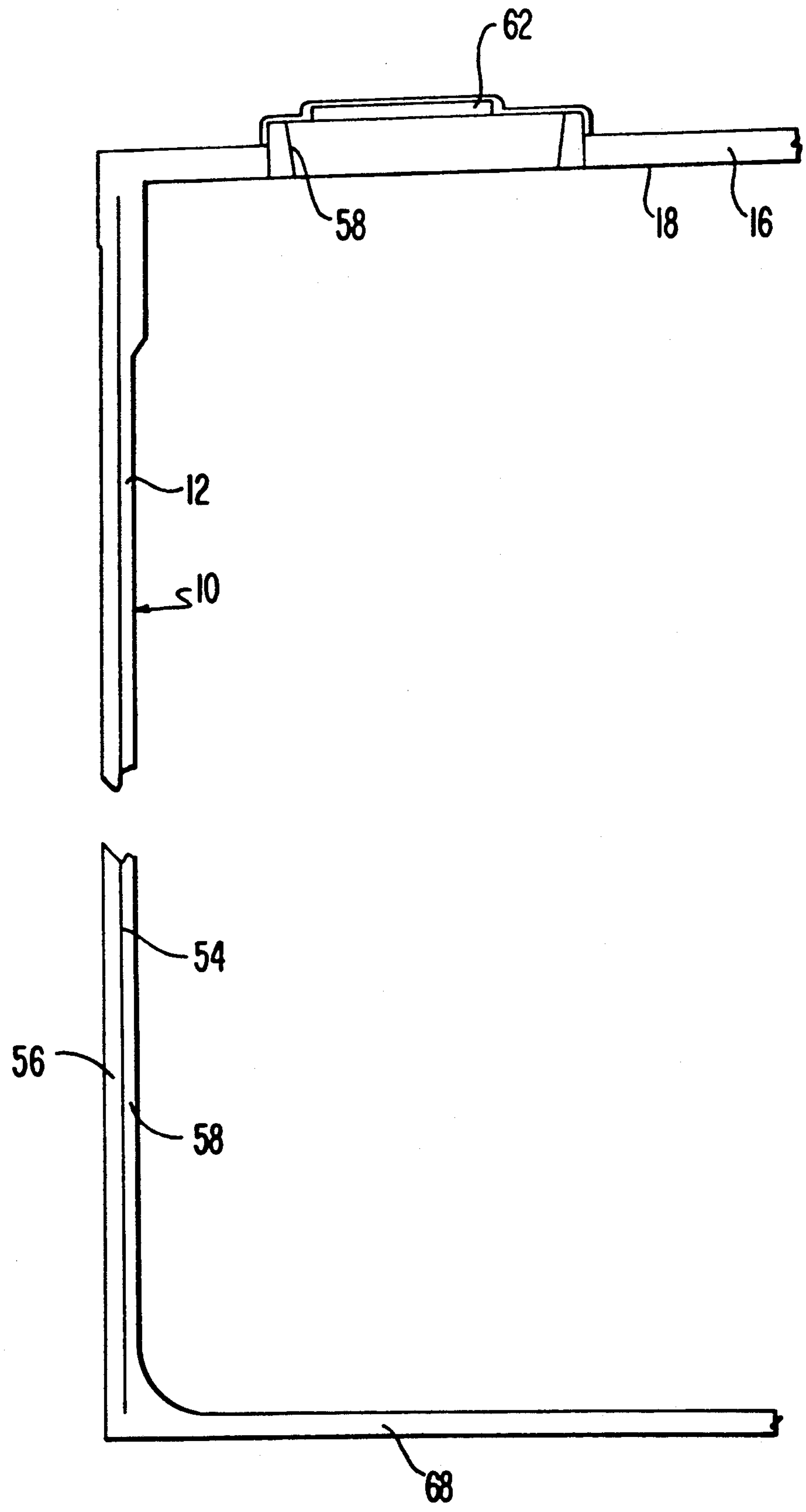
FIG. 3 is an enlarged, fragmentary cross-sectional elevational view illustrating a preferred peripheral wall construction for the tank of FIG. 1.

Thus, the tank 10 of the present application may include a wall 12 as illustrated in FIG. 3 which consists of a diaphragm 54 which extends continuously around the entire periphery of tank 10. Diaphragm 54 may preferably consist of a series of side-by-side steel panels which extend vertically the entire height of wall 12 and which are joined together at the adjacent vertical edges thereof by sealed pump joints of the sort described in the '520 patent. The composite wall 12 may also include an outer layer 56 of shotcrete or the like and an inner layer 58, also of shotcrete or the like. The entire structure may then be prestressed using prestressing tendons as described in the patent identified above. In this regard, the prestressing wires are not shown in FIG. 3; however, such prestressing wires are fully described in the cited '520 patent, the entirety of the disclosure of which is hereby specifically incorporated herein by reference.

In actual application, tank 10 may be 55 feet in diameter and may have a water depth up to high water level 42 of 28 feet and 6 inches. Thus, tank 10 has a capacity of approximately 500,000 gallons. Roof 16 may be constructed of reinforced concrete and may have a thickness of about 7½ inches. Accordingly, roof 16 will be heavy enough to resist the buoyancy of the water which fills the conical area beneath surface 18 during the fill cycle. Baffle wall 24, which also may be constructed of reinforced concrete, may have a thickness of about 6 inches and diameter of about 18 feet. Opening 20 may preferably be about 8 feet in diameter and opening 48 may be about 3½ feet wide and 7 feet high.

For practical purposes, tank 10 may include an external caged ladder 56, an access hatch 58 and an internal ladder 60. Hatch 58 may include a fiber glass cover 62. Tank 10 may also be provided with several preoast concrete overflows 64 which may be set to overflow at approximately 2 inches above the high water level.

Tank 10 may also be provided with a conventional drain pipe 66 which is mounted similarly to the pipe 50. Pipes 66, 50 and 29 may be 10 inch nominal inside diameter pipes and the upper end 32*a* of vertical pipe 32 may be expanded to 14 inches inside diameter to more evenly distribute the water flowing into the top of aerator 34.

A concrete footing 67 may be provided beneath baffle wall 24 to assist in supporting roof 16 as illustrated in FIGS. 1 and 4. Needless to say, baffle walls 24 and 26, roof 16, floor 68 and wall 12 each should be appropriately reinforced with steel reinforcing rod and reinforcing materials in a manner whioh is consistent with conventionally accepted engineering practices.

We claim:

1. A self washing, concrete water storage tank comprising:

a generally upright, peripheral concrete wall extending around and defining a water storage chamber;

a concrete roof mounted atop said wall in substantial covering relationship to said chamber, said roof having an internal concrete surface facing said chamber and an opening therein defining a confined space which is in fluid communication with the chamber and which is disposed at an elevation that is higher than said internal surface;

conduit means for introducing water to be stored into said chamber;

a water level controller device operable to cause water to flow into the chamber through said conduit means until water fills the chamber and contacts and washes the entire extend of said internal concrete surface as the water rises to remove any residue that is accumulated on said internal concrete surface and moves upwardly into said space to a level sufficient to activate said controller device to shut off said water flow into the chamber, said roof being configured and structured so as to resist the buoyancy of water under the roof to thus prevent lifting or collapse of the roof when said chamber is full of water and water is in contact with the entire extent of said interior concrete surface of the roof.

2. A tank as set forth in claim 1, wherein said roof is essentially flat.

3. A tank as set forth in claim 2, wherein said peripheral concrete wall is cylindrical.

4. A tank as set forth in claim 3, wherein said wall comprises a prestressed composite wall.

5. A tank as set forth in claim 2, wherein is included internal baffle wall means in the chamber dividing the chamber into two or more chamber portions.

6. A tank as set forth in calim 5, wherien said baffle wall means provides vertical support for said roof.

7. A tank as set forth in claim 6, wherein said peripheral concrete wall is cylindrical.

8. A tank as set forth in claim 7, wherien said baffle wall which supports the roof is cylindrical and concentrically arranged relative to said peripheral wall.

9. A tank as set forth in claim 1, wherien said roof is conical.

10. A tank as set forth in claim 1, wherein said roof is domed.

11. A tank as set forth in claim 1, wherein said peripheral concrete wall is cylindrical.

12. A tank as set forth in claim 11, wherein said wall comprises a prestressed composite wall.

13. A tank as set forth in claim 1, wherein is included internal baffle wall means in the chamber dividing the chamber into two or more chamber portions.

14. A tank as set forth in claim 1, wherein said device comprises a sensor disposed at a predetermined level in said space for generating a signal when water rises into the space and comes into contact with the sensor.

15. A tank as set forth in claim 14, wherein said device includes a control valve in said conduit means, said control valve being operable to close said conduict means in response to the generation of said signal by said sensor.

16. A method for washing the interior surfaces of a concrete water storage tank having a generally upright, peripheral wall extending around and defining a water storage chamber, a concrete roof mounted atop the wall in substantial covering relationship to said chamber and having an internal concrete surface facing the chamber and an opening therein defining a confined space which is in fluid communication with the chamber and which is disposed at an elevation that is higher than said internal concrete surface, said method comprising:

storing water in said chamber under conditions such that water is periodically withdrawn thereform for use;

periodically introducing water to be stored into said chamber; and controlling said introduction of water into the tank with a water level controller device in such a manner that the introduction continues until water fills the chamber and contacts and washes the entire extent of said internal concrete surface as the water rises to remove any residue that is accumulated on said internal concrete surface and mvoes upwardly into said space to a level sufficient to activate said controller device to shut off said water flow into the chamber.

17. A method as set forth in claim 16, wherein said concrete roof is configured and structured so as to resist the buoyancy of water under the roof to thus prevent lifting or collapse of the roof when water in the chamber is in contact with the entire extent of the interior surface of the roof.

18. A method as set forth in claim 17, wherein said roof is essentially flat.

19. A method as set forth in claim 17, wherein said roof is conical.

20. A method as set forth in claim 17, wherein said roof is domed.

21. A self washing, concrete water storage tank comprising:

a generally upright, peripheral concrete wall extending around and defining a water storage chamber;

a concrete roof mounted atop said wall in substantial covering relationship to said chamber, said roof having an internal concrete surface facing said chamber;

structure defining a confined space which is in fluid communication with the chamber and which is disposed at an elevation that is higher than said internal concrete surface;

conduit means for introducing water to be stored into said chamber;

a water level controller device operable to cause water to flow into the chamber through said conduit means until water fills the chamber and contacts and washes the entire extent of said internal concrete surface as the water rises to remove any residue that is accumulated on said internal concrete surface and moves upwardly into said space to a level sufficient to activate said controller device to shut off said water flow into the chamber, said roof being configured and structured so as to resist the buoyancy of water and under the roof to thus prevent lifting or collapse of the roof when said chamber is full of water and water is in contact with the entire extent of said interior concrete surface of the roof.

22. A method for washing the interior surfaces of a concrete water storage tank having a generally upright, peripheral walle xtending around and defining a water storage chamber, a concrete roof mounted atop the wall in substantial covering relationship to said chamber and having an internal concrete surface facing the chamber, and structure defining a confined space which is in fluid communication with the chamber and which is disposed at an elevation that is higher than said internal concrete surface, said method comprsiing:

storing water in said chamber under conditions such that water is periodically withdrawn thereform for use;

periodically introducing water to be stored into said chamber; and controlling said introduction of water into the tank with a water level controller device in such a manner that the introduction continues until water in the chamber and contacts and washes the entire extent of said internal concrete surface as the water rises to remove any residue that is accumulated on said itnernal concrete surface and moves upwardly into said space to a level sufficient to activate said controller device to shut off said water flow into the chamber.

23. A self washing, concrete water storage tank comprising:

a generally upright, peripheral concrete wall extending around and defining a water storage chamber;

a concrete roof mounted atop said wall in substantial covering relationship to said chamber, said roof having an internal concrete surface facing said chamber;

conduit means for introducing water to be stored into said chamber a water level controller device operable to cause water to flow into the chamber through said conduit means until water fills the chamber and contacts and washes the entire extent of said internal concrete surface as the water rises to remove any residue that is accumulated on said internal concrete surface and moves upwardly to the top of said chamber to activate said controller device to shut off said water flow into the chamber, said roof being configured and structured so as to resist the buoyancy of water under the roof to thus prevent lifting or collapse of the roof when said chamber is full of water and water is in contact with the entire extent of said interior concrete surface of the roof.

* * * * *